United States Patent
Henmi

(10) Patent No.: US 8,001,549 B2
(45) Date of Patent: Aug. 16, 2011

(54) MULTITHREADED COMPUTER SYSTEM AND MULTITHREAD EXECUTION CONTROL METHOD

(75) Inventor: Masanori Henmi, Kyoto (JP)

(73) Assignee: Panasonic Corporation, Osaka (JP)

( * ) Notice: Subject to any disclaimer, the term of this patent is extended or adjusted under 35 U.S.C. 154(b) by 1124 days.

(21) Appl. No.: 11/740,501

(22) Filed: Apr. 26, 2007

(65) Prior Publication Data

US 2007/0266387 A1    Nov. 15, 2007

(30) Foreign Application Priority Data

Apr. 27, 2006 (JP) ................................ 2006-123748

(51) Int. Cl.
G06F 9/46 (2006.01)
G06F 9/44 (2006.01)
(52) U.S. Cl. ................... 718/108; 712/220; 712/228
(58) Field of Classification Search ............ 718/108
See application file for complete search history.

(56) References Cited

U.S. PATENT DOCUMENTS

| | | | |
|---|---|---|---|
| 5,987,492 A | | 11/1999 | Yue |
| 6,052,708 A | * | 4/2000 | Flynn et al. .................... 718/108 |
| 6,076,157 A | * | 6/2000 | Borkenhagen et al. ....... 712/228 |
| 6,105,051 A | * | 8/2000 | Borkenhagen et al. ....... 718/103 |
| 6,212,544 B1 | * | 4/2001 | Borkenhagen et al. ....... 718/103 |
| 6,223,208 B1 | * | 4/2001 | Kiefer et al. .................. 718/108 |
| 6,272,517 B1 | | 8/2001 | Yue et al. |
| 6,567,839 B1 | * | 5/2003 | Borkenhagen et al. ....... 718/103 |
| 6,606,704 B1 | * | 8/2003 | Adiletta et al. ............... 712/248 |
| 6,697,935 B1 | * | 2/2004 | Borkenhagen et al. ....... 712/228 |
| 6,954,846 B2 | * | 10/2005 | Leibholz et al. ............... 712/43 |
| 7,386,707 B2 | | 6/2008 | Kurata et al. |
| 7,389,403 B1 | * | 6/2008 | Alpert et al. ..................... 712/10 |
| 7,487,504 B2 | | 2/2009 | Peterson |
| 7,650,602 B2 | * | 1/2010 | Amamiya et al. ............ 718/104 |
| 7,657,891 B2 | * | 2/2010 | Jensen et al. .................. 718/102 |
| 7,719,540 B2 | * | 5/2010 | Piazza et al. .................. 345/557 |
| 7,730,544 B2 | * | 6/2010 | Volp ................................ 726/27 |
| 7,765,547 B2 | * | 7/2010 | Cismas et al. ................ 718/100 |

(Continued)

FOREIGN PATENT DOCUMENTS

JP        11-212809        8/1999

(Continued)

OTHER PUBLICATIONS

UltraSPARC Architecture 2005, Sun Microsystems, Inc, Jun. 19, 2008, Copyright 2002-2005( Only Chapter. 15 of this document is supplied in this office action, p. 529-561).*

(Continued)

Primary Examiner — Jennifer To
(74) Attorney, Agent, or Firm — Greenblum & Bernstein, P.L.C.

(57) ABSTRACT

A multithreaded computer system of the present invention includes a plurality of processor elements (PEs) and a parallel processor controller which switches threads in each PE. The parallel processor controller includes a plurality of execution order registers which hold, for each processor element, an execution order of threads to be executed; a plurality of counters which count an execution time for a thread that is being executed by each processor element and generate a timeout signal when the counted time reaches a limit assigned to the thread; and a thread execution scheduler which switches the thread that is being executed to the thread to be executed by each processor element based on an execution order held in the execution order register and the timeout signal.

2 Claims, 5 Drawing Sheets

U.S. PATENT DOCUMENTS

| | | |
|---|---|---|
| 7,917,907 B2 * | 3/2011 | Ahmed et al. ............... 718/104 |
| 7,921,281 B2 | 4/2011 | Kurata et al. |
| 7,930,520 B2 | 4/2011 | Kurata et al. |
| 2002/0095614 A1 * | 7/2002 | Rodgers et al. ............. 713/500 |
| 2003/0149716 A1 | 8/2003 | Peterson |
| 2003/0149864 A1 | 8/2003 | Furukawa et al. |
| 2003/0233394 A1 * | 12/2003 | Rudd et al. .................. 709/107 |
| 2004/0060052 A1 * | 3/2004 | Brown et al. ................ 718/107 |
| 2004/0216101 A1 * | 10/2004 | Burky et al. ................. 718/100 |
| 2005/0047439 A1 * | 3/2005 | Madajczak ................... 370/469 |
| 2005/0081020 A1 * | 4/2005 | Volp ............................. 712/228 |
| 2005/0149936 A1 * | 7/2005 | Pilkington ................... 718/102 |
| 2005/0198476 A1 * | 9/2005 | Gazsi et al. .................. 712/228 |
| 2006/0100986 A1 * | 5/2006 | MacPherson .................... 707/2 |
| 2006/0101252 A1 * | 5/2006 | Tomisawa ..................... 712/228 |
| 2006/0107262 A1 * | 5/2006 | Bodas et al. ................. 718/100 |
| 2006/0117316 A1 * | 6/2006 | Cismas et al. ............... 718/103 |
| 2006/0123251 A1 * | 6/2006 | Nakajima et al. ............ 713/300 |
| 2006/0136915 A1 * | 6/2006 | Aingaran et al. ............ 718/100 |
| 2006/0161760 A1 * | 7/2006 | Jordan et al. ................ 711/205 |
| 2006/0179291 A1 * | 8/2006 | Di Gregorio ................. 712/228 |
| 2007/0043912 A1 * | 2/2007 | Hetherington et al. ....... 711/141 |
| 2007/0113056 A1 * | 5/2007 | Dale et al. ................... 712/228 |
| 2007/0174597 A1 * | 7/2007 | Joy et al. ..................... 712/228 |
| 2007/0294517 A1 * | 12/2007 | Ayrignac et al. ............. 712/228 |
| 2008/0046684 A1 * | 2/2008 | Emma ............................ 712/14 |
| 2008/0172667 A1 * | 7/2008 | Inoue et al. .................. 718/100 |
| 2008/0209162 A1 | 8/2008 | Furukawa et al. |
| 2008/0209192 A1 | 8/2008 | Furukawa et al. |
| 2008/0215858 A1 | 9/2008 | Furukawa et al. |
| 2010/0088646 A1 * | 4/2010 | Nishimori et al. ........... 715/838 |

FOREIGN PATENT DOCUMENTS

| | | |
|---|---|---|
| JP | 11-282815 | 10/1999 |
| JP | 2003-241980 | 8/2003 |
| JP | 2003-271399 | 9/2003 |

OTHER PUBLICATIONS

UltraSPARC T1™ Supplement to the UltraSPARC Architecture 2005, Sun Microsystems, Inc., Mar. 17, 2006, Copyright 2002-2006.*

English Language Abstract of JP 11-282815, Jun. 15, 2007.

Japan Office action, mail date is May 17, 2011.

* cited by examiner

MULTITHREADED COMPUTER SYSTEM AND MULTITHREAD EXECUTION CONTROL METHOD

BACKGROUND OF THE INVENTION (1) Field of the Invention

The present invention relates to multithreaded computer systems including multiprocessor elements that operate in parallel, and particularly to a multithreaded computer system and a multithread execution control method that switch programs in each processor element.

(2) Description of the Related Art

There are parallel processing systems that have a multiprocessing architecture including plural processor elements in order to provide an enhanced processing capability.

In some cases, in order to further enhance the processing capability, the parallel processing systems employ a method in which one process is divided into plural control flows (programs) called "threads", and the threads are executed in parallel by plural processors.

For example, Japanese Laid-Open Patent Publication No. 11-282815 discloses a conventional method for use with a parallel processing system that have a multiprocessing architecture in which plural threads are executed in parallel as described above.

When looking at one processor in the parallel processing system, a single processor element executes plural threads while switching the threads in accordance with predetermined factors. With this control, the single processor element causes the threads to be executed in parallel in a pseudo manner. In this case, each thread is executed to exclusively occupy a single processor, and therefore can be conceived as being individually assigned to and executed by a virtual processor.

Each virtual processor is not necessarily required to have all functions of a real processor, and may have only information required for executing the threads. The information required for executing the threads includes thread-specific control information and data information such as program counters, flag registers, stack areas and general-purpose registers. These pieces of information are referred to as the "contexts".

In order to switch a thread that is currently being executed by a single processor element to another thread, it is necessary to switch contexts. Typically, the contexts are stored in memory, and therefore switching the contexts involves writing the context for the thread that is currently being executed into the memory (referred to herein as "save") and reading the context for the next thread to be executed from the memory (referred to herein as "restore").

Incidentally, in the method described in Japanese Laid-Open Patent Publication No. 11-282815 (FIG. 2 of this Publication), thread preemption (switching to a thread with a higher priority level) is accepted by hardware, rather than by an operating system, and the operating system does not intervene with a switching process after the acceptance of the preemption, which provides high-speed user level interruption to enhance the efficiency of multithread processing. In this method, however, every time the threads are switched, a thread scheduler present in a user process is executed by a processor element, thereby scheduling all threads included in the user process.

SUMMARY OF THE INVENTION

However, the conventional technology has the following problems. Specifically, the first problem of the conventional technology is such that every time the threads are switched, thread switching overhead occurs. The reason for this is that the processor switches the threads by executing the thread scheduler present in the user process.

The second problem of the conventional technology is such that even when plural threads in a single user process can be executed in parallel, a single processor element is assigned to the single user process, and thus even if another processor element is not executing any thread in another user process, it is not possible to cause that processor element to execute any thread in the same process.

Therefore, it is not possible to satisfactorily enhance substantial availability of the parallel processing system, leading to a reduction in system performance.

In view of the above problems, the present invention has an object to provide a multithreaded computer system and a multithread execution control method that are capable of enhancing substantial availability of plural processor elements.

In order to achieve the above object, a multithreaded computer system includes: a plurality of processor elements, each of which executes a process including a plurality of threads; and a control unit which switches threads to be executed in each processor element, in which the control unit includes: a plurality of execution order registers, each of which is provided for a corresponding one of the processor elements, and which holds an execution order of threads to be executed by the corresponding processor elements; a plurality of counters, each of which is provided for a corresponding one of the processor elements, each counter counting an execution time period for a thread that is being executed by the corresponding processor element and generating a timeout signal when the counted time reaches a limit assigned to the thread; and a scheduling circuit operable to switch the thread that is being executed to the thread to be executed by each processor element based on the execution order held in said execution order register and the timeout signal. With this configuration, determination of the next thread to be executed and thread switching are performed by the scheduling circuit, making it possible to reduce thread switching overhead, so that the substantial availability of the multithreaded computer system can be enhanced.

In this case, before execution of the plurality of threads starts, the execution order may be written into one of the plurality of execution order registers by the corresponding processor element. With this configuration, it is possible for the scheduling circuit to determine the next thread to be executed at high speed in accordance with the execution order register.

Also, the control unit may further include a mode register which holds mode information indicating either a single thread mode for disabling said scheduling circuit or a multithread mode for enabling the scheduling circuit, and the mode register is writable by the processor element. With this configuration, as long as initial settings such as setting of the execution order in the execution order registers are performed in the single thread mode, it is possible for the scheduling circuit to perform thread switching at high speed after transition to the multithread mode.

In addition, the control unit may further include a plurality of priority level registers each of which is provided for a corresponding one of said processor elements, which holds priority level information indicating a thread that is to be preferentially executed in accordance with an interrupt signal to said processor element, and when another interrupt signal is externally inputted, the scheduling circuit switches the thread to a thread corresponding to the interrupt signal. With this configuration, it is possible to perform high-speed switching to a thread for an interruption process with a high priority level.

In addition, each of the processor elements may include two context register groups which hold a context for a thread that is being executed and a context for a thread that is to be executed next, the scheduling circuit may further include a context transfer unit operable to transfer context to save and restore contexts for the processor elements, the scheduling circuit may switch the context register groups at the time of thread switching, and the context transfer unit may transfer the context after the thread switching. With this configuration, saving and restoring of contexts can be hidden, making it possible to further enhance the availability of the multithreaded computer system.

In addition, the control unit may further include: a status register indicating whether each processor element is in an execution state or in a stopped state; and a plurality of possibility information holding units provided corresponding to the processor elements, each possibility information holding unit holding possibility information as to whether parallel thread execution is possible, and when any of the processor elements has transitioned from the execution state to the stopped state, the scheduling circuit may further determine a thread available for parallel execution from among threads for other processor elements based on the possibility information, and cause the processor element in the stopped state to execute the determined thread. With this configuration, the processor element in the stopped state can be efficiently utilized to cause one process to be executed not only by a single processor element but also by a plurality of processor elements, whereby it is possible to further enhance the availability of the multithreaded computer system.

In addition, wherein the possibility information may include first information indicating whether or not parallel execution with another thread in the same process is possible and second information indicating whether or not execution by another processor element is possible, and each of the possibility information holding units may include: a first register which holds the first information; and a second register which holds the second information. Furthermore, before the execution of the threads starts, the execution order, the first information and the second information may be respectively set in the execution order register, the first register and the second register by the corresponding processor element. With this configuration, it is possible to flexibly set whether to allow parallel execution depending on processing details of each thread.

In addition, the multithreaded computer system may further includes a clock control unit which suppresses a clock signal from being supplied to any processor element in the stopped state.

In addition, the control unit may further include a clock control register which holds clock control information indicating whether or not clock supply should be suppressed, for each processor element, and the control unit may enable or disable the clock control unit for each processor element in accordance with the clock control information. With this configuration, it is possible to suppress clock supply to processor elements in the stopped state for each processor element.

In addition, a multithread execution control method of the present invention is for use in a multithreaded computer system including: A multithread execution control method for use in a multithreaded computer system including: a plurality of processor elements which executes a process including a plurality of threads; and a control unit which switches threads to be executed in each processor element, in which the control unit includes: a plurality of execution order registers provided corresponding to their respective processor elements, each execution order register holding an execution order of threads to be executed in the corresponding processor element; a plurality of counters provided corresponding to their respective processor elements, each counter counting an execution time for a thread being executed by the corresponding processor element and generating a timeout signal when the counted time reaches a limit assigned to the thread; and a scheduling circuit operable to switch the thread that is being executed to the thread to be executed by each processor element based on the execution order held in said execution order register and the timeout signal, and the multithread execution control method includes: setting the execution order in the execution order register when the corresponding processor element is in a single thread mode; setting the processor element in a multithread mode; and executing a thread in the processor element in the multithread mode, while performing thread switching. With this configuration, as long as initial settings such as setting of the execution order in the execution order registers are performed in the single thread mode, it is possible for the scheduling circuit to perform thread switching at high speed after transition to the multithread mode.

As is apparent from the above description, the present invention makes it possible to significantly reduce time loss in thread switching in a parallel processing system for executing fine grain threads, while switching the threads. In addition, it is possible to efficiently utilize processor elements in the stopped state. Thus, it is possible to enhance the availability of the multithreaded computer system.

FURTHER INFORMATION ABOUT TECHNICAL BACKGROUND TO THIS APPLICATION

The disclosure of Japanese Patent application No. 2006-123748 filed on Apr. 27, 2006, is incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT

Hereinafter, an embodiment of the present invention will be described in detail with reference to the drawings.

Figure 1:
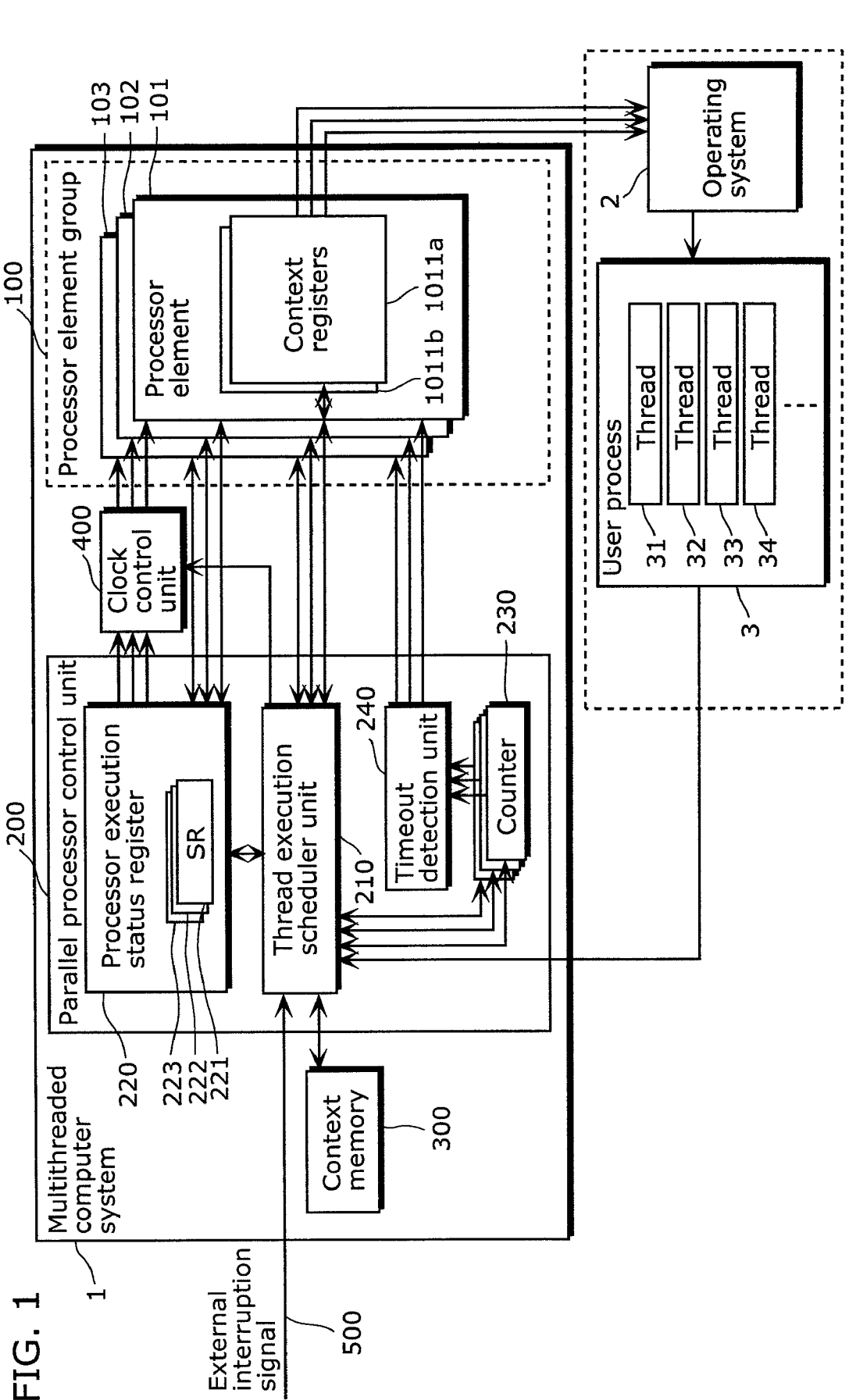
FIG. 1 is a functional block diagram of a multithreaded computer system according to an embodiment of the present invention.

FIG. 1 is a functional block diagram illustrating the overall configuration of a multithreaded computer system according to an embodiment of the present invention.

As shown in FIG. 1, a multithreaded computer system 1 includes a processor element group 100, a parallel processor control unit 200, a context memory 300, and a clock control unit 400. Note that schematically shown within broken lines at the bottom of the diagram are an operating system 2 and a user process 3 that are stored in memory.

The processor element group 100 includes plural processor elements. For ease of explanation, the processor element group 100 herein includes three processor elements: a first processor element 101, a second processor element 102 and a third processor element 103. Each processor element executes a thread in a process including plural threads, while switching the threads.

The parallel processor control unit 200 includes: a thread execution scheduler unit 210; a processor execution status register 220; three counter 230 provided corresponding to their respective processor elements, each counter 230 counting an execution time for a thread being executed by the corresponding processor element; and a timeout detection unit 240.

The parallel processor control unit 200 functions as a control unit for switching threads that are to be executed in each processor element.

The thread execution scheduler unit 210 is a scheduling circuit configured in the form of hardware. When the timeout detection unit 240 detects that the time counted by any counter 230 reaches a limit assigned to a thread, the thread execution scheduler unit 210 switches the thread being executed to the thread to be executed. In addition, when any processor element is transitioned from the execution state to the stopped state, the thread execution scheduler unit 210 determines a thread available for parallel execution out of threads for other processors, and causes the processor in the stopped state to execute the determined thread.

A processor execution status register 220 includes status registers 221 to 223. The status registers 221 to 223 are corresponding to the first processor element 101 to the third processor element 103, respectively, and hold status data for the corresponding processor element. The status data includes information indicating either the execution state or the stopped state.

The counters 230 are provided corresponding to their respective processor elements, each counter counting an execution time for a thread that is being executed by the corresponding processor element.

Figure 2:
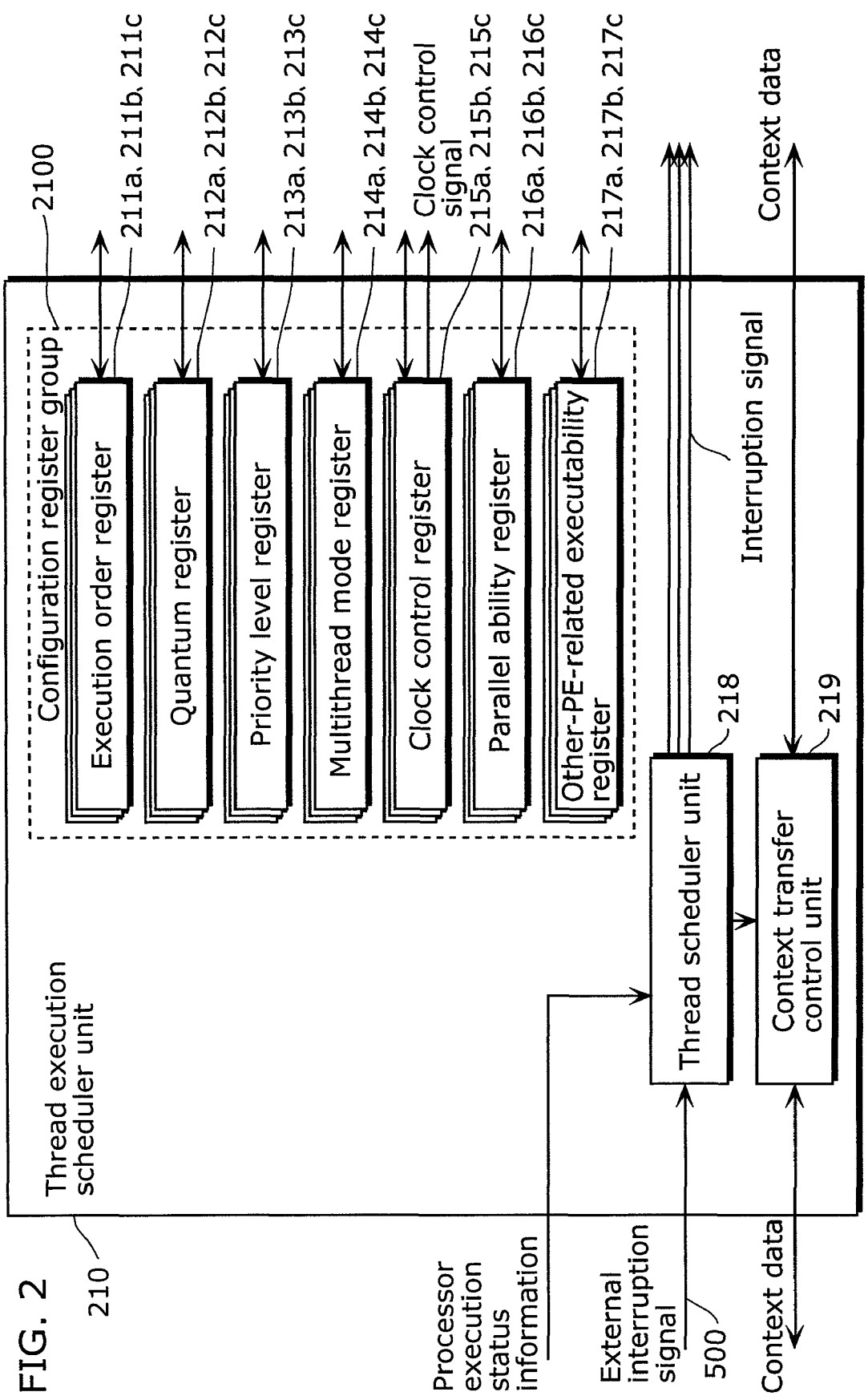
FIG. 2 is a functional block diagram of a thread execution scheduler unit.

FIG. 2 is a functional block diagram of the thread execution scheduler unit 210. The thread execution scheduler unit 210 includes a configuration register group 2100, a thread scheduler unit 218, and a context transfer control unit 219.

The configuration register group 2100 includes execution order registers 211a to 211c, quantum registers 212a to 212c, priority level registers 213a to 213c, multithread mode registers 214a to 214c, clock control registers 215a to 215c, parallel ability registers 216a to 216c, and other-PE-related executability registers 217a to 217c. The suffixes "a" to "c" of the reference characters are intended to indicate correspondence with the first processor element 101 to the third processor element 103.

Figure 3:
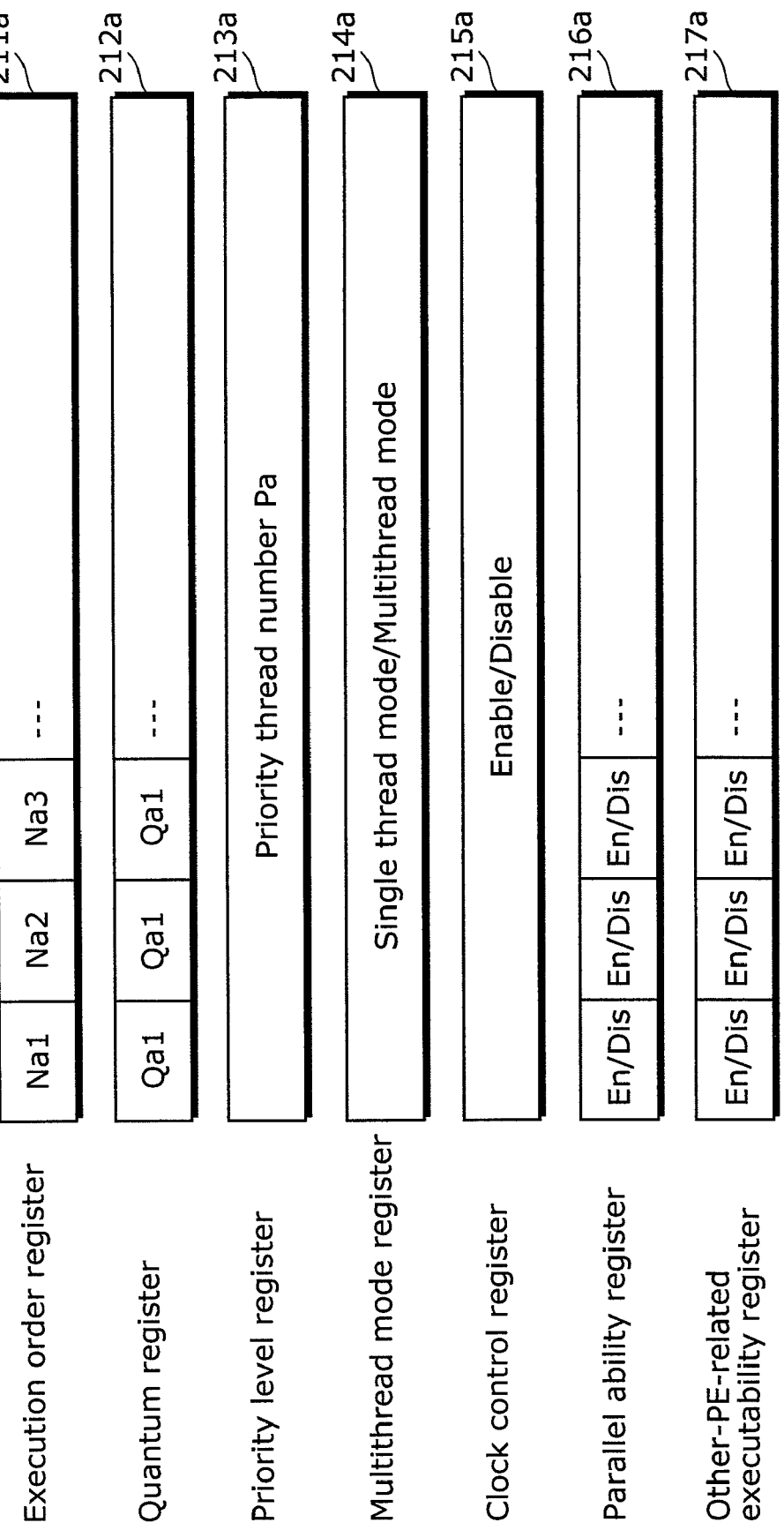
FIG. 3 is a diagram illustrating a specific example of a configuration register group.

FIG. 3 is a diagram illustrating a specific example of the configuration register group 2100. In FIG. 3, only registers corresponding to the first processor element 101 are shown, but registers corresponding to the second processor element 102 and the third processor element 103 are similar thereto.

The execution order register 211a holds an order in which threads that are to be executed in the corresponding processor element are executed. In the figure, Na1, Na2, Na3, . . . are intended to indicate a sequence of thread numbers corresponding to the threads to be executed in the corresponding processor element 101, and indicate the numbers of the threads to be executed first, second, third, and so on. The thread that is to be executed after the thread assigned with the largest thread number is the thread with thread number Na1. That is, the execution order register 211a indicates a cyclic execution order. Note that the execution order register 211a does not have to be a single register, and may be configured of plural registers.

The quantum register 212a indicates a period of time assigned for each thread that is to be executed by the corresponding processor element. In FIG. 3, Qa1, Qa2, Qa3, . . . correspond to Na1, Na2, Na3, . . . , respectively, and are each intended to indicate a period of time (a quantum) assigned to its corresponding thread by, for example, the number of cycles.

The priority level register 213a holds priority level information indicating a thread that is to be preferentially executed in accordance with an interruption signal to the corresponding processor element. In the figure, the priority level information is a priority thread number Pa, which indicates a thread number of the thread to be preferentially executed.

The multithread mode register 214a holds mode information indicating either a single thread mode or a multithread mode. The mode information, when indicating the single thread mode, disables the thread execution scheduler unit 210. As a result, the corresponding processor element is caused to operate in the single thread mode, which does not involve thread switching. The mode information, when indicating the multithread mode, enables the thread execution scheduler unit 210. As a result, the corresponding processor element is caused to operate in the multithread mode, which involves thread switching. After the multithreaded computer system 1 is reset, the multithread mode register 214a holds the mode information indicating the single thread mode.

The clock control register 215a holds clock control information indicating whether or not it is possible to suppress clock supply to the corresponding processor element (enabled or disable).

The parallel ability register 216a holds, for each thread, parallel executability information indicating whether it is possible to perform parallel execution with another thread in the same process. The parallel executability information indicates either enabledness or disabledness for each thread.

The other-PE-related executability register 217a holds other-PE-related executability information indicating executabilty by other processor elements. The other-PE-related executability information indicates whether each thread is enabled or disabled. The parallel executability information and the other-PE-related executability information as described above are collectively referred to as the "ability information regarding whether parallel thread execution is possible".

Figure 4:
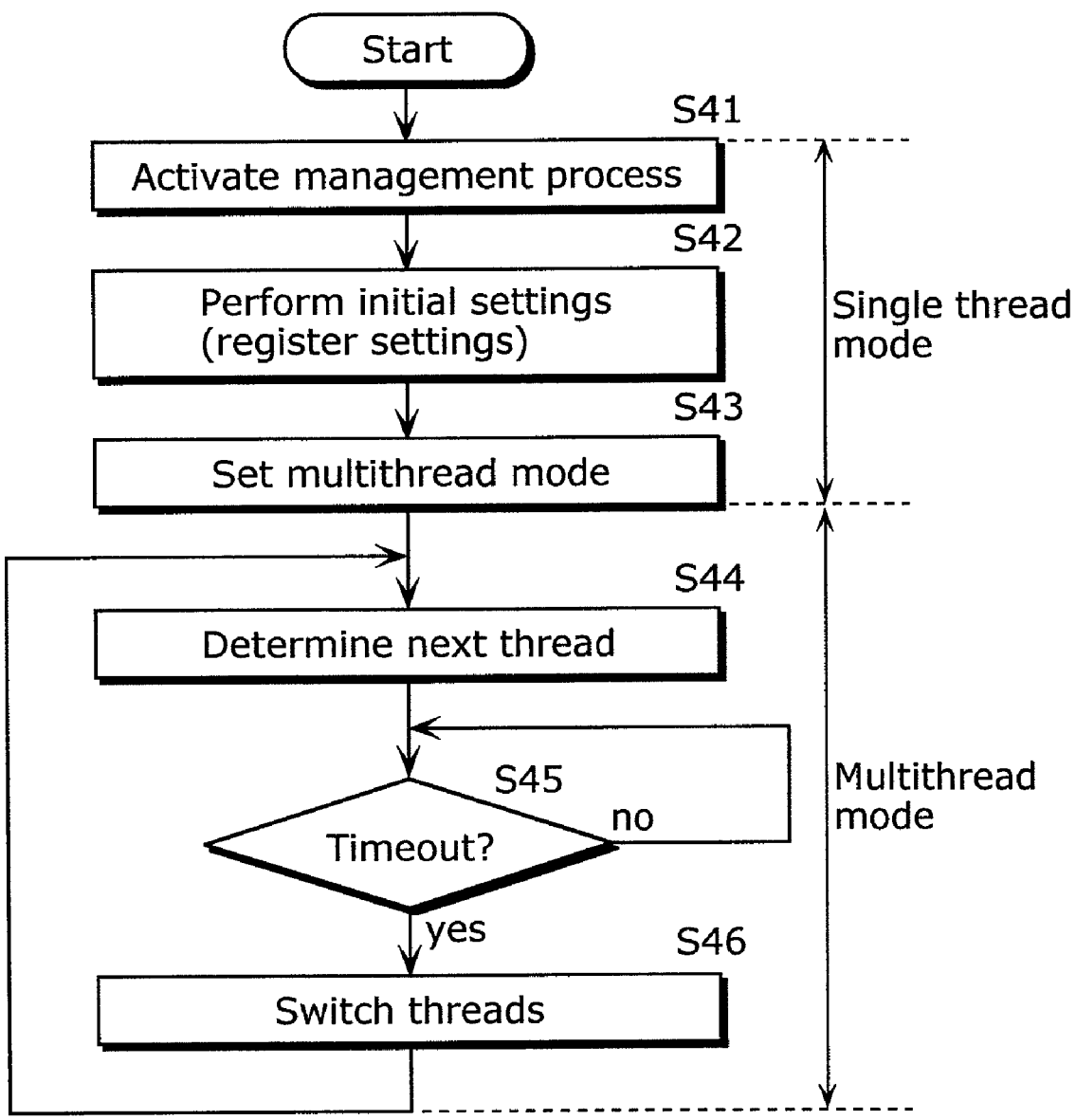
FIG. 4 is a flowchart illustrating a process that is performed after activation.

FIG. 4 is a flowchart illustrating a process that is performed after the multithreaded computer system 1 is activated. Hereinafter, when the suffixes "a" to "c" are omitted from the reference characters of the registers in the configuration register group 2100, it is intended to indicate a representative register corresponding to any one processor element.

As shown in FIG. 4, after the multithreaded computer system 1 is turned on or reset, the first processor element 101 to the third processor element 103 are respectively activated in the single thread mode to execute one process (referred to as the "management process") without switching threads (S41). The management process is a process for setting an initial value for the processor element. Each processor element executes the management process to set a register value required for the multithread mode in each register of the configuration register group 2100, excluding the multithread mode register 214 (S42), and further sets the multithread mode in the multithread mode register 214 (S43). As a result, the processor element starts to operate in the multithread mode. That is, the thread execution scheduler unit 210 is enabled.

During the multithread mode, the thread execution scheduler unit 210 instructs the processor element execute the first thread to be executed. Further, the thread execution scheduler unit 210 determines a thread to be executed next, and transfers the context of the determined thread to sub context registers (S44). Here, the sub context registers are registers, out of context registers 1011a and 1011b, which is not used for the thread currently being executed. Subsequently, when the timeout detection unit 240 detects a timeout (S45), the thread execution scheduler unit 210 switches the threads for a processor element corresponding to the timeout (S46). In the thread switching, context registers holding the context for the thread being executed (referred to as the "main context registers") is switched to the sub context registers holding the next context to be executed, and furthermore, the threads are switched. After the thread switching, the context from the context registers different from the new main context registers are saved into the memory, and the context corresponding to the next thread after the thread currently being executed is restored from the memory into that context registers (S44).

In this manner, the thread switching during the multithread mode is executed by hardware, i.e., the parallel processor control unit 200, rather than by the thread scheduler in the user process, and therefore can be performed at high speed without incurring any time loss, whereby it is possible to enhance the availability of the multithreaded computer system 1.

Figure 5:
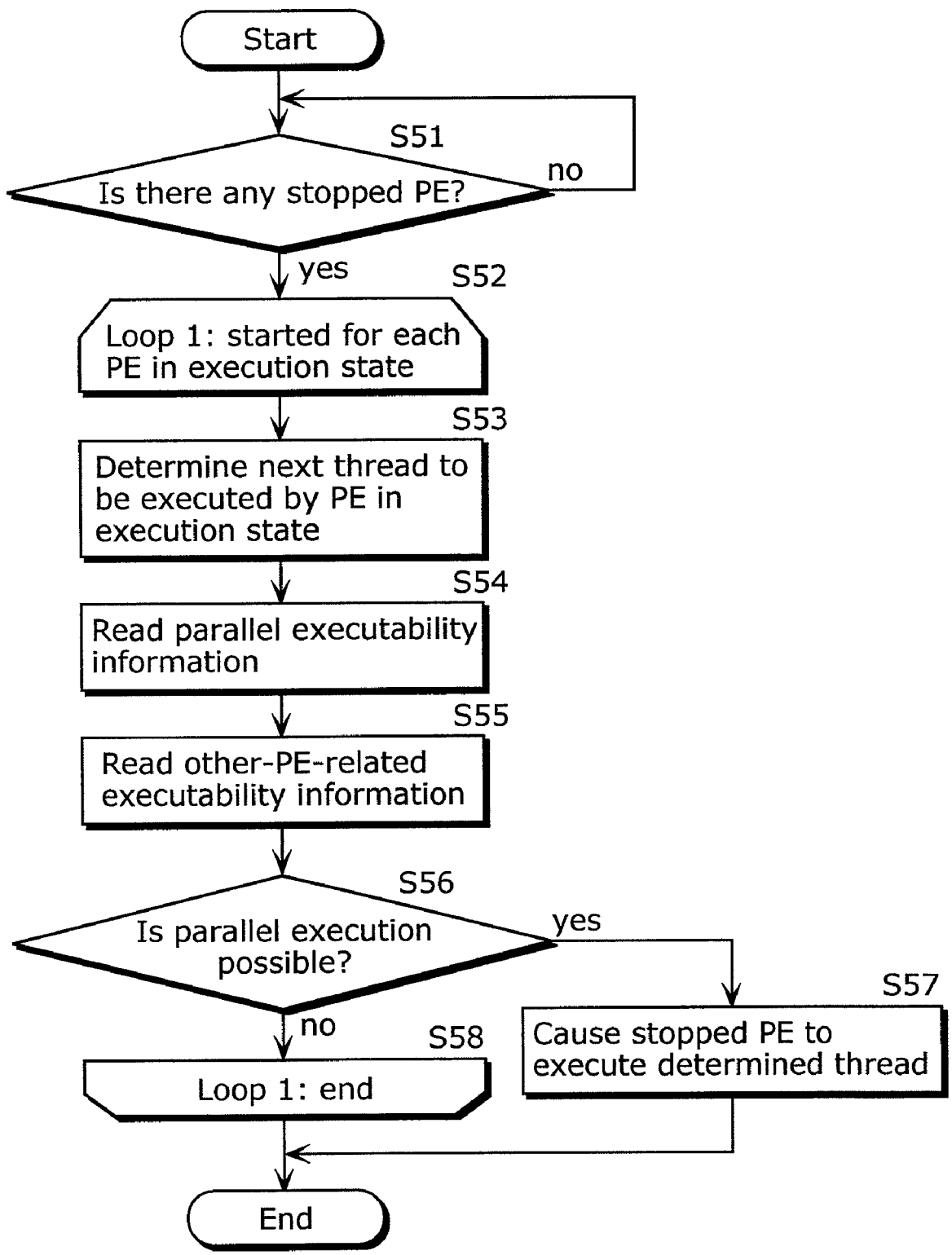
FIG. 5 is a flowchart illustrating a process for assigning a thread to a processor element in a stopped state.

FIG. 5 is a flowchart illustrating a process for assigning a thread to a processor element in the stopped state within the thread execution scheduler unit 210. As shown in FIG. 5, the thread execution scheduler unit 210 determines whether any processor element has transitioned from the execution state to the stopped state (S51). Herein, the stopped state refers to a state where the thread is waiting for another thread to be processed or waiting for a response from an external resource. When any processor element has transitioned from the execution state to the stopped state, the thread execution scheduler unit 210 performs the following process for each processor element in the execution state (S52 to S58; loop 1). In the loop 1, the thread execution scheduler unit 210 determines the next thread to be executed in the processor element in the execution state (S53), and reads parallel executability information and other-PE-related executability information that are corresponding to the thread that is being executed in the processor element (referred to as the "current thread") (S54, S55) to determine whether the current thread and the next thread to be executed can be executed in parallel (S56). In this determination, when (a) the parallel executability information concerning the current thread indicates enabledness, (b) the parallel executability information concerning the next thread to be executed indicates enabledness, and (c) the other-PE executability information concerning the next thread to be executed indicates enabledness, the thread execution scheduler unit 210 determines that the next thread can be executed in parallel with the current thread by the processor in the stopped state, while determining that parallel execution is not possible when at least one of (a) to (c) is disabledness.

When it is determined that parallel execution is possible, the thread execution scheduler unit 210 causes the processor element in the stopped state to execute the next thread (S57), thereby exiting loop 1. At this time, before causing the processor element in the stopped state to execute the next thread, the thread execution scheduler unit 210 saves the context for a thread stopped in the processor element in the stopped state, and restores the context for the next thread to be executed. The thread executed in the processor element in the stopped state is switched back to the original thread after a time period assigned to the executed thread.

In this manner, the processor element in the stopped state is efficiently utilized to cause one process to be executed not only by a single processor element but also by plural processor elements, whereby it is possible to further enhance the availability of the multithreaded computer system. In addition, the parallel executability information and the other-PE-related executability information can be set for each thread, and therefore it is possible to flexibly set whether to allow parallel execution depending on processing details of each thread.

Note that the flowchart of FIG. 5 illustrates the control logic flow of the thread execution scheduler unit 210, which is implemented in the form of hardware by the execution scheduler unit.

Described next is an exemplary operation according to the embodiment of the present invention.

When the operating system 2 starts the user process 3 that is to be executed in the first processor element 101, the user process 3 first stores pieces of information for each of the threads 31, 32, 33 and 34 to the execution order register 211a, the quantum register 212a, the priority level register 213a, the parallel ability register 216a and the other-PE-related executability register 217a, which are corresponding to the first processor element 101 and implemented in the thread execution scheduler unit 210, the pieces of information respectively indicating an execution order, a quantum value and a priority level, whether parallel execution is enabled/disabled, whether other-PE-related execution is enabled/disabled. In addition, information indicating whether clock supply can be suppressed is stored to the clock control register 215a. In the following description, for ease of explanation, the threads are executed in the order: 31, 32 and 33 (as for the thread 34, see the later description).

After the first processor element 101 transitions to the multithread mode, the context transfer control unit 219 reads the context for the thread 31 from the context memory 300, and stores the read context to a context registers 1011 of the first processor element 101. Thereafter, the first processor element 101 refers to the value in the context registers 1011, and starts executing the thread 31.

At the same time as the execution of the thread 31 started by the first processor element 101, the counter 230 starts decrementing a value set in the quantum register 212a corresponding to the thread 31 one by one starting from its initial value.

Furthermore, at this time, the context transfer control unit 219 implemented in the thread execution scheduler 210 reads the context for the thread 32 to be executed next from the context memory 300, and stores the read context to the context registers 1011 implemented in the processor element 100 (i.e., "context restoration").

When the first processor element 101 continues to execute the thread 31 so that the value of the counter 230 is decremented to zero, the timeout detection unit 240 detects that the value of the counter 230 is decremented to zero, and outputs to the first processor element 101 an interruption signal to perform thread switching.

After performing a process for context switching, the first processor element 101 having received the interruption signal changes a context source to be read to the context registers 1011 in which the context for the thread 32 has already been stored, and starts executing the thread 32.

After the execution of the thread 32 is started, the context transfer control unit 219 reads the context for the thread 31 implemented in the first processor element 101, from the context registers having that context stored therein, and stores the read context to the context memory 300 (i.e., "context saving").

Thereafter, execution of the threads 32 and 33, and corresponding context switching are performed in the same manner.

When the execution of the thread 33 is completed, the thread 31 is executed next. Thereafter, the threads are executed in the order: 31, 32, 33, 31 (subsequent execution will follow this pattern). Note that the execution order information that indicates such an execution order is prestored as an attribute in the execution order register 211a as shown in FIG. 3.

Described next is an operation in which an external interruption signal 500 is inputted to the thread scheduler unit 218. When the external interruption signal 500 is inputted, the thread scheduler unit 218 makes a schedule such that any thread that is required to be executed urgently is executed next. Here, the description is given on the assumption that it is the thread 34 that is required to be executed urgently. In this case, the context transfer control unit 219 reads the context for the thread 34 from the context memory 300 and stores the read context to the context registers 1011 in the first processor element 101, and furthermore the context transfer control unit 219 outputs to the first processor element 101 an interruption signal to perform thread switching. Thereafter, the first processor element 101 executes the thread 34 next. Note that the information as to whether the thread 34 is "the thread that is required to be executed urgently" is preset as an attribute in the priority level register 213a. In addition, a thread number corresponding to an interruption process for preferential execution may be set in the priority level register 213a as shown in FIG. 3, and the setting may be performed for each thread. In such a case, the thread corresponding to the interruption process is set to have the highest priority level.

While the method for executing the user process 3 in the first processor element 101 has been described above, the same can be applied to the case of executing other user processes in the second processor element 102 and the third processor element 103.

Described next is the function of the processor execution status register 220. The processor execution status register 220 has stored therein information indicating whether the processor elements 101, 102 and 103 included in the processor element group 100 are respectively executing a thread. The information indicating whether a thread is being executed is outputted from each of the processor elements 101, 102 and 103, and held in the processor execution status register 220.

The function of the processor execution status register 220 will be described in more detail with respect to the above-described example.

While the first processor element is executing the thread 31 in the user process 3 that is to be executed in the first processor element, the thread scheduler unit 218 schedules the next thread (here, the thread 32) that is to be executed after the thread 31. At this time, the thread scheduler unit 218 refers to information concerning the status of thread execution in the second processor element 102 included in the processor execution status register 220, and if no thread to be executed in the second processor element 102 is detected, the thread scheduler unit 218 makes a schedule such that the thread 32 is executed in the second processor element 102. The context transfer control unit 219 reads the context for the thread 32 from the context memory, and stores the read context to the context registers of the second processor element 102 (the register being implemented in the second processor element). Note that information as to whether the thread 32 can be executed in any processor other than the first processor 101, and information as to whether the threads 31 and 32 can be executed in parallel are prestored as attributes in the priority level register 213.

Further, priority level information concerning a thread (here, thread A) that is scheduled to be executed in the first processor 101 and priority level information concerning a thread (here, thread B) that is scheduled to be executed in the second processor (the two pieces of priority level information being prestored in the priority level registers 213a and 213b) are compared to each other, and if the thread A has a priority level higher than that of the thread B, the thread A is scheduled to be executed in the second processor 102 prior to execution of the thread B. Note that information as to whether the thread A can be executed in any processor other than the first processor is preset as an attribute in the priority level register 213a.

While the information indicating whether any thread is being executed has been described as being outputted from each processor element in the processor element group 100, this information may be set by the thread scheduler unit 210.

Described next is the function of the clock control unit 400. The processor execution status register 220 is connected to the clock control unit 400. The clock control unit 400 refers to a value set in the clock control register 215 and a value in the processor execution status register 220, and controls clock supply to each processor element in the processor element group 100. Specifically, when the value set in the clock control register 215 is information indicating "control to stop the clock", the clock control unit 400 monitors the value in the processor execution status register 220, and, for example, stops clock supply to the first processor element 101 upon detection of no thread to be executed in the first processor element 101. This function makes it possible to achieve a significant effect of reducing unnecessary power consumption in the multithreaded computer system.

While the present embodiment has been described with the specific number of processor elements and the specific number of threads included in the user process 3, the numbers are determined for ease of explanation and are not intended to be restrictive.

In addition, the configuration of the configuration register group 2100 is also illustrated for ease of explanation, and it is understood that the same function can be achieved by other configurations.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

INDUSTRIAL APPLICABILITY

The multithreaded computer system according to the present invention is applicable as an audio recording/reproducing device, or a video recording/reproducing device, in a mobile apparatus such as a cell phone in which plural processors execute a process for recording/reproducing music in parallel with a process for recording/reproducing video.

What is claimed is:

1. A multithreaded computer system, comprising:
a plurality of processor elements, each processor element being operable to execute a process including a plurality of threads; and
a controller operable to switch threads to be executed in each processor element, said controller including:
a plurality of execution order registers, each execution order register being provided for a corresponding one of said processor elements, and which holds an execution order of threads to be executed by said corresponding processor elements;
a plurality of counters, each counter being provided for a corresponding one of said processor elements, each counter counting an execution time period for a thread that is being executed by said corresponding processor element and generating a timeout signal when the counted time reaches a limit assigned to the thread; and
a scheduler operable to switch the thread that is being executed to a thread to be executed by each processor element based on the execution order held in said execution order register and the timeout signal;
a status register indicating whether each processor element is in an execution state or in a stopped state; and
a plurality of possibility information holders provided corresponding to said processor elements, each possibility information holder holding possibility information as to whether parallel thread execution is possible, and
when any of said processor elements has transitioned from the execution state to the stopped state, said scheduler further determines a thread available for parallel execution from among threads for other processor elements based on the possibility information, and causes said processor element in the stopped state to execute the determined thread,
wherein the possibility information includes first information indicating whether or not parallel execution with another thread in the same process is possible and second information indicating whether or not execution by another processor element is possible, and
each of said possibility information holders includes:
a first register which holds the first information; and
a second register which holds the second information.

2. The multithreaded computer system according to claim 1,
wherein before the execution of the threads starts, the execution order, the first information and the second information are respectively set in said execution order register, said first register and said second register by the corresponding processor element.

* * * * *